United States Patent Office.

AMOR SMITH, OF BALTIMORE, MARYLAND.

Letters Patent No. 99,251, dated January 25, 1870.

IMPROVED PROCESS FOR TREATING FISH TO OBTAIN OILS AND FERTILIZERS.

The Schedule referred to in these Letters Patent and making part of the same.

*To all whom it may concern:*

Be it known that I, AMOR SMITH, of Baltimore, in the county of Baltimore, and State of Maryland, have invented an Improved Process for Treating Fish in the Production of Oils and their Conversion into a Fertilizer, of which the following is a specification.

The first part of my process relates to the rendering of the fish for obtaining their oil, and its second part to the conversion of the dry residuum into a fertilizer.

For the first part of my process, I use that set forth in other specifications filed herewith for an improved process for rendering fatty animal matter, either rancid or not, as the case may be, and refer to such specification, and also to another for an improved apparatus for the purpose, also filed concurrently with this, for a more full description of whatever appertains to the rendering-process.

The fish are to be placed in a close tank or digester, and subjected to the action of highly-heated air, the temperature of which must be sufficient to release the oils and crisp the dry residuum. This air is introduced under pressure from a pressure-blast, and is heated by well-known methods in passing from the pressure-blast to the tank.

The oil thus rendered is to be drawn off through apertures at or near the bottom of the tank, in the manner set forth in such specifications, and if the fish are in process of decomposition, the gases should be carried away and disinfected in the manner set forth in the specification for a process for treating rancid animal matter, where the location of the rendering-establishment is such as to make it desirable to do so.

When this part of the process has been completed to as full an extent as is reasonably practicable, the fish-scrap is taken from the tank and subjected to pressure in a suitable press, for the purpose of expressing the oil remaining in the muscular fibre, after which the scrap is to be ground in a mill suitable for the purpose, such, for instance, as the mill adapted for grinding such substances, as set forth in Letters Patent of the United States, issued to me on the 26th day of November, A. D. 1867, to which I refer for further information.

If the scrap is not found to be sufficiently dry when ground, to avoid the danger of its decomposing, it should be further dried by passing it through a desiccator, such, for instance, as that set forth in Letters Patent of the United States, issued to me on the 4th day of May, A. D. 1869, for such an apparatus.

If the scrap is not fine enough, as delivered from the first grinding-mill above referred to, it must be, when perfectly desiccated, run through another mill, so constructed as to grind it as fine as it is required for the market.

When the scrap has been thus freed from oleaginous and watery particles, it will be free from disagreeable odors, and remain in this state, if kept dry, until needed for use.

I am aware that it has been proposed to dry fish in a chamber heated to a temperature of 170° to 190°, for the purpose of expelling a portion of the water contained in their tissues, as a step preparatory to their impregnation with antiseptic gases, such being described in the patent of O. Lugo, of December 14, 1869; but my process differs from this in the use of a much higher degree of heat for the purpose of rendering the oils contained in the fish, and then converting the scrap into a fertilizer, by merely pressing and grinding, and further subsequent desiccation, if necessary, relying simply upon the desiccation and expression of the oleaginous matter, without resorting to antiseptics.

What I claim, and desire to secure by Letters Patent, is—

The process for treating fish, in rendering their oils and preparing the scraps for use as a fertilizer, by rendering the oil in a close tank under action of highly-heated air, introduced under pressure, and subsequently pressing and grinding the scrap with or without further desiccation, substantially as set forth.

In testimony whereof, I have signed my name to this specification, in the presence of two subscribing witnesses.

AMOR SMITH.

Witnesses:
R. MASON,
B. EDW. J. EILS.